US011101539B2

(12) United States Patent
Buydens et al.

(10) Patent No.: US 11,101,539 B2
(45) Date of Patent: Aug. 24, 2021

(54) METHOD AND SYSTEM FOR AUTOMATIC ANTENNA ALIGNMENT

(71) Applicant: Trilliant Networks, Inc., Cary, NC (US)

(72) Inventors: Jason Buydens, Apex, NC (US); Christopher Bull, Milford, MA (US)

(73) Assignee: Trilliant Networks, Inc., Cary, NC (US)

(*) Notice: Subject to any disclaimer, the term of this patent is extended or adjusted under 35 U.S.C. 154(b) by 113 days.

(21) Appl. No.: 16/423,782

(22) Filed: May 28, 2019

(65) Prior Publication Data

US 2019/0393583 A1 Dec. 26, 2019

Related U.S. Application Data

(60) Provisional application No. 62/689,285, filed on Jun. 25, 2018.

(51) Int. Cl.
*H01Q 1/12* (2006.01)
*G05D 1/10* (2006.01)
*B64C 39/02* (2006.01)

(52) U.S. Cl.
CPC ........... *H01Q 1/1257* (2013.01); *B64C 39/02* (2013.01); *B64C 39/024* (2013.01); *G05D 1/10* (2013.01); *G05D 1/101* (2013.01); *H01Q 1/12* (2013.01); *H01Q 1/1264* (2013.01); *B64C 2201/146* (2013.01)

(58) Field of Classification Search
CPC ...... H01Q 1/1257; H01Q 1/1264; H01Q 1/12; G05D 1/101; G05D 1/10; B64C 39/024; B64C 2201/146; B64C 39/02
USPC ........................................................ 343/702
See application file for complete search history.

(56) References Cited

U.S. PATENT DOCUMENTS

| | | | | |
|---|---|---|---|---|
| 9,802,701 B1* | 10/2017 | Hawes | ............... | G05D 1/0088 |
| 2015/0237569 A1* | 8/2015 | Jalali | ............... | H04B 7/18528 |
| | | | | 370/326 |
| 2016/0269917 A1* | 9/2016 | Hillegas, Jr. | .......... | H04W 24/02 |
| 2016/0309337 A1* | 10/2016 | Priest | .................... | H04W 16/18 |
| 2017/0013413 A1* | 1/2017 | Singh | ..................... | H04W 4/02 |
| 2017/0150373 A1* | 5/2017 | Brennan | ............... | H04W 16/28 |

OTHER PUBLICATIONS

PCT International Search Report and Written Opinion dated Sep. 20, 2019 for International application No. PCT/US2019/034165, 12 pgs.

* cited by examiner

*Primary Examiner* — Hai V Tran
(74) *Attorney, Agent, or Firm* — Moser Taboada

(57) ABSTRACT

A computer implemented method and apparatus for automatic antenna alignment. The method comprises receiving a request to initiate antenna alignment; collecting location data from the drone; collecting location data from the target device; calculating bearing and altitude of the drone and the target device using the collected location data; and aligning the drone with the target device based on the calculated bearing and altitude.

20 Claims, 6 Drawing Sheets

METHOD AND SYSTEM FOR AUTOMATIC ANTENNA ALIGNMENT

CROSS-REFERENCE TO RELATED APPLICATIONS

This application claims priority to U.S. Provisional Patent Application Ser. No. 62/689,285 filed Jun. 25, 2018, which is incorporated by reference herein in its entirety.

BACKGROUND OF THE INVENTION

Field of the Invention

Embodiments of the present invention generally relate to antenna alignment, and more specifically to automatic antenna alignment of a drone site survey tool.

Description of the Related Art

The concept of drones has existed for nearly 200 years, however just in the past few years they have been gaining popularity in many contexts spanning from military to commercial applications. With recent advancements in drone technology the industry is seeing more partnerships across more industries developing in the area, in fact many construction and telecoms companies are already seriously investing in drone technology. Microwave technologies are using drones for site surveys and engineering of microwave paths today, using drones to capture high resolution photos in the direction of the link and then post process them to determine line of site.

However, in utility networks, assets are typically mounted on utility poles which have an installation height near or below the tops of tree canopies and buildings. Due to the difficulties associated with the canopy level design that requires sites to be surveyed & RF testing prior to installation.

This ensures that the design is accurate and sites are installed in the appropriate location to meet the requirements of the customer prior to spending a significant amount of time and money on installation. The current process for Site Surveys & RF Testing is laborious, time consuming, and expensive, utilizing bucket trucks to raise Gateway and Extender Bridge equipment at the designed location and height in order to mimic as installed conditions and performing link quality tests.

Not only is using bucket trucks inefficient and costly, it also involves a number added resource costs, such as bucket truck operators. In addition, it is difficult to get into the exact position for testing due to the size and mobility of the truck, as well as not being able to replicate installations on towers or very tall assets.

Therefore, there is a need for a method and apparatus for automatic antenna alignment.

SUMMARY OF THE INVENTION

An apparatus and/or method is provided for automatic antenna alignment substantially as shown in and/or described in connection with at least one of the figures.

These and other features and advantages of the present disclosure may be appreciated from a review of the following detailed description of the present disclosure, along with the accompanying figures in which like reference numerals refer to like parts throughout.

Figure 1:
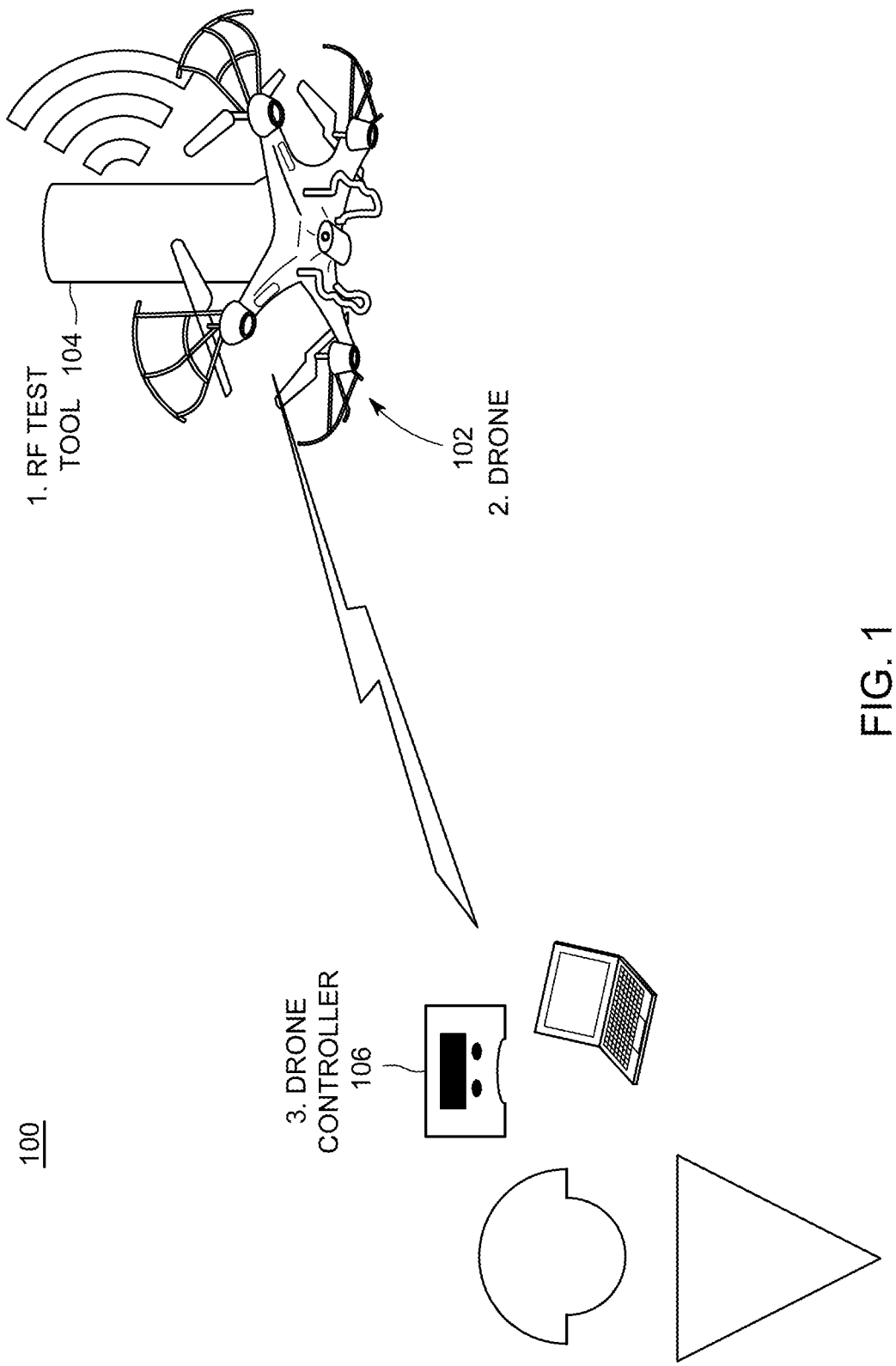
FIG. 1 depicts the components of a drone site survey tool for automatic antenna alignment, according to one or more embodiments of the invention.

While the method and apparatus is described herein by way of example for several embodiments and illustrative drawings, those skilled in the art will recognize that the method and apparatus for automatic antenna alignment is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for automatic antenna alignment defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Techniques are disclosed for a system and method for automatic antenna alignment, according to embodiments of the invention. A drone controller is used to initiate alignment of an antenna of a RF Test Tool that is attached to a drone and an antenna of a target device. The target device may be a second drone test unit or an installed gateway. The drone site survey tool may be used for RF testing of the link to a partner drone, RF testing to an installed piece of equipment, visual and line of sight survey and photography, aerial compound survey and photography, visual inspection of installed devices located on utility poles or communication tower, and the like. The automatic antenna alignment is initiated from the drone controller. The drone controller collects GPS and altitude data from both the RF Test Tool on the drone and the target device. The bearing and altitude are calculated on the drone controller to determine the bearing and height required of the drone carrying the RF Test Tool in order to achieve optimal alignment with the target device. The drone then aligns itself with the target device, and optionally a link test is performed.

Various embodiments of a method and apparatus for automatic antenna alignment are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. Although the present application describes the invention using drone controllers in communication with target devices, one skilled in the art will appreciate that any the present invention may be implemented on specific or general purpose computers (e.g., cloud servers) that communicate with devices.

FIG. 1 depicts the components of a drone site survey tool for automatic antenna alignment, according to one or more embodiments of the invention. The drone site survey tool 100 includes a drone 102, an RF test tool 104, and a drone controller 106. The RF test tool 104 is detachable from the drone 102. The drone 102 is capable of vertical takeoff and landing, automatic stable hover, and is capable of flying to a vertical height of more than 200 feet while equipped with the RF test tool 104. The drone 102 also includes on-board power for the RF test tool 104. The drone controller 106 is capable of communicating wirelessly with the RF test tool 104 in order to collect data from the RF test tool 104.

The drone site survey tool 100 is capable of performing link tests with either a paired partner drone or another installed network device, the network device selectable from a list presented on the drone controller 106. While the drone site survey tool 100 performs link tests on the primary frequency by default, an automated function to test the link at each available frequency and band is available. The results for each frequency are stored and displayed at the end of the test, with the best available frequency/band provided on the display.

Figure 2:
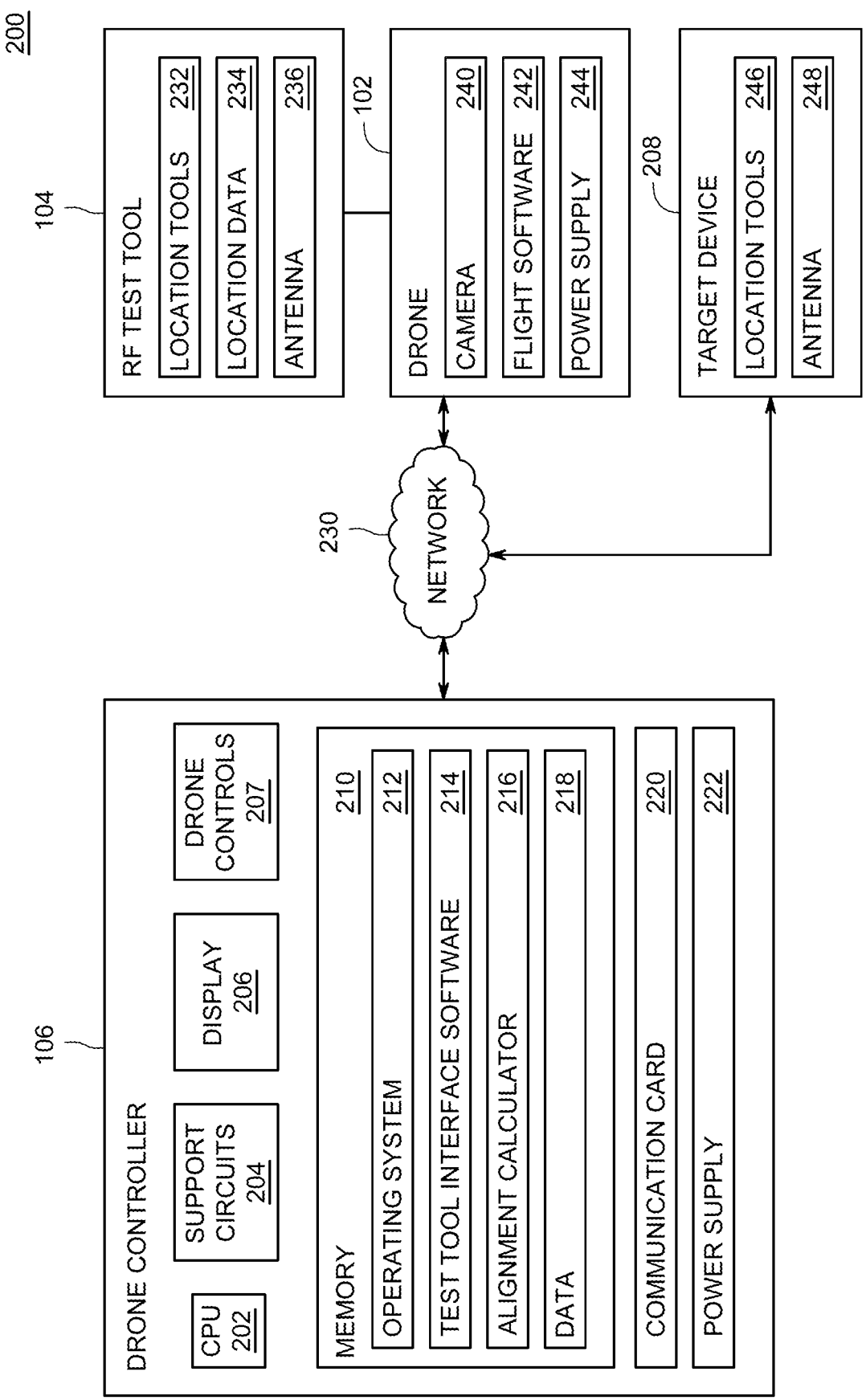
FIG. 2 depicts a block diagram of a system for automatic antenna alignment, according to one or more embodiments of the invention.

FIG. 2 depicts a block diagram of a system 200 for automatic antenna alignment, according to one or more embodiments of the invention. The system 200 includes the drone controller 106, RF test tool 104, drone 102, and a target device 208, communicatively coupled via network 230. The drone controller 106 includes a Central Processing Unit (CPU) 202, support circuits 204, a display 206, drone controls 207, a memory 210, a communication card 220, and a battery, other power or energy storage device or power supply 222. The CPU 202 may include one or more commercially available microprocessors or microcontrollers that facilitate data processing and storage. The various support circuits 204 facilitate the operation of the CPU 202 and include one or more clock circuits, power supplies, cache, input/output circuits, and the like. The memory 210 includes at least one of Read Only Memory (ROM), Random Access Memory (RAM), disk drive storage, optical storage, removable storage and/or the like. The memory 210 includes an operating system 212, test tool interface software 214, an alignment calculator 216, data 218 associated with the RF test tool 104 and target device 208. The operating system 212 may include various commercially known operating systems. In some embodiments, the communication card 220 may interface between the drone controller 106 and the network 230. The drone controller 106 communicates to the drone 102 and the RF test tool 104. In some embodiments the drone controller 106 communicates to the drone 102 via a different interface than the drone controller 106 communicates to the RF test tool 104. The RF test tool 104 then communications to the target device 208. The target device 208 sends the information to the drone controller 106 through the RF test tool 104.

The drone 102 includes at least a camera 240, and a power supply 244 for the RF test tool 104. The RF test tool 104 includes location tools 232, stored location information 234 and an antenna 236. The location tools 232 may be capable of determining and providing latitude and longitude information (e.g., GPS location information) regarding the location of the RF test tool 104 as well as altitude information for the RF test tool 104. The determined information may be stored as location information 234. The antenna 236 may be an omni-directional antenna. The target device 208 may be identical to the RF test tool 104 and include the same components, specifically location tools, location information and an antenna 246. The target device 208 may be a gateway or other network device comprising other components. At least, the target device 208 includes an antenna 246 and location tools 248 for determining GPS and altitude information. The antenna 246 may be an omni-directional antenna.

The network 230 includes a communication system that connects computers (or devices) by wire, cable, fiber optic and/or wireless link facilitated by various types of well-known network elements, such as hubs, switches, routers, and the like. The network 108 may be a part of the Intranet using various communications infrastructure, such as Ethernet, Wi-Fi, a personal area network (PAN), a wireless PAN, Bluetooth, Near field communication, and the like. For example, the drone controller 106 may communication with the drone 102, which may be 2.4 or 5.8 Ghz. The drone controller 106 may communication with the RF test tool 104 via a WiFi like connection, such as 2.4 Ghz or an Ethernet/

Serial wired connection. The communication between the RF test tool 104 and the target device 208 may be on 5.8 Ghz WAN.

When a link test is to be initiated, whether between the RF test tool 104 and a target device 208 that is a second drone or a target device 208 that is a previously installed network device, the drone 102 must align itself to an optimal azimuth and altitude in order to achieve the best possible link. In order to validate the optimum link performance, the drone 102 needs to be positioned with the proper height and orientation. Before the automatic aligning processes begins, the user may position the drone 102 in a test location, with the estimated height and bearing required, and using the camera feed equipped on the drone 102, visually verify if line of sight (LOS) to the target device 208 is possible. Once positioned in the approximate location, a link may be established and tested.

When the initial link is established, an auto alignment procedure is initiated on drone controller 106. The test tool interface software 214 request GPS and altitude data from the RF test tool 104 and from the target device 208. When the information is received on the drone controller 106, the information is stored as data 218. The alignment calculator 216 uses the GPS coordinates and altitude information received from the devices 104 and 208 to calculate the bearing and altitude required of the RF test tool 104 that is needed to achieve optimal alignment. The test tool interface software 214 sends the calculated bearing and/or altitude adjustment to the drone's autonomous flight software 242, which proceeds to make the necessary altitude and/or bearing adjustments. The calculated bearing and/or altitude adjustment is also displayed on display 206. While maintaining the current longitude and latitude, the drone 102 aligns itself to the optimal azimuth and altitude. In some embodiments, a user may select which adjustment to make, selecting the azimuth, the altitude, or both. Once the drone 102 is oriented to the appropriate height and bearing, the link is tested for the final optimal values.

Figure 3A:
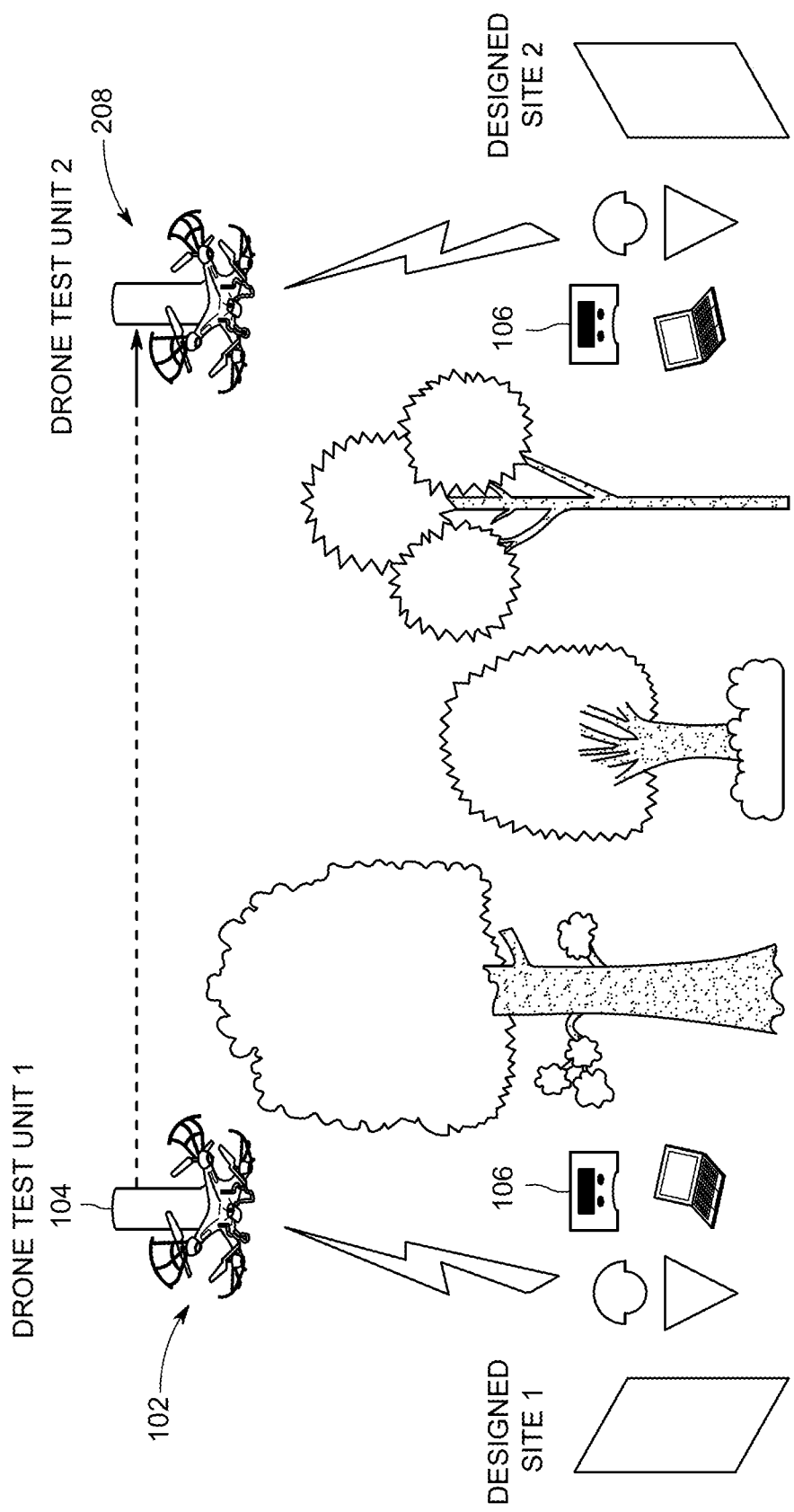
FIGS. 3A and 3B depict exemplary environments for use of the drone site survey tool according to one or more embodiments of the invention.
Figure 3B:
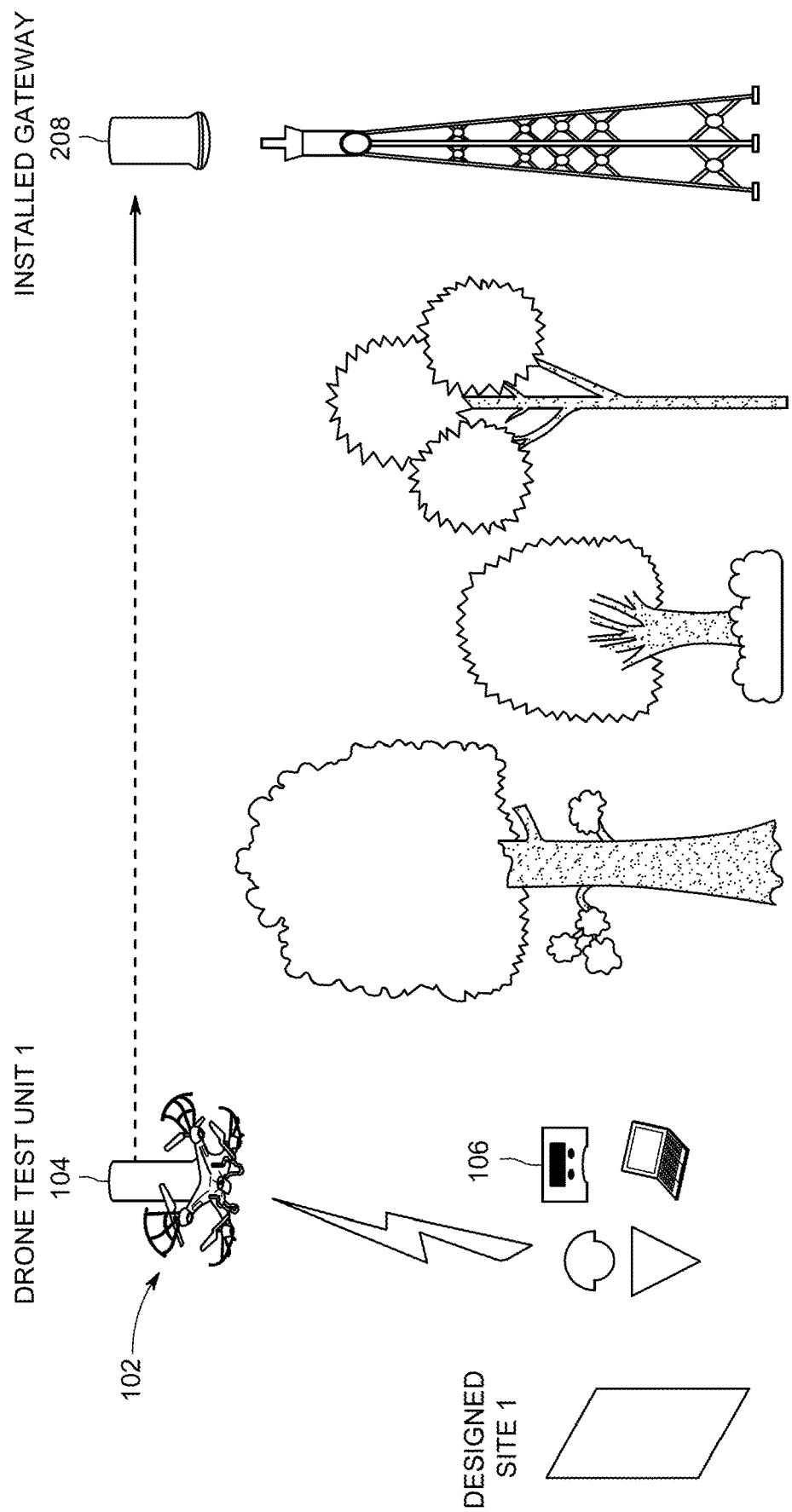

FIGS. 3A and 3B depict exemplary environments for use of the drone site survey tool according to one or more embodiments of the invention. FIG. 3A depicts the drone 102 equipped with the RF test tool 104 aligning with a target device 208, wherein the target device 208 is a second test drone unit. FIG. 3B depicts the drone 102 equipped with the RF test tool 104 aligning with a target device 208, wherein the target device 208 is an installed gateway. Due to the location of each target device 208, use of the drone 102 provides a more efficient, cost effective way to perform a site survey.

Figure 4:
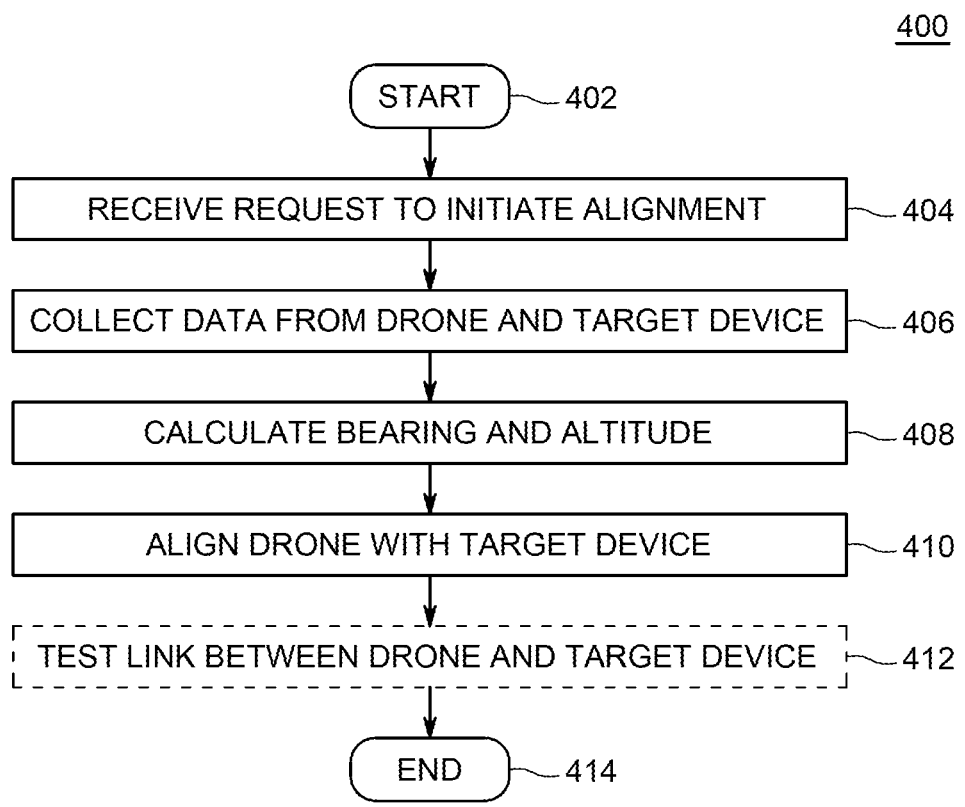
FIG. 4 depicts a flow diagram of a method for automatic antenna alignment, according to one or more embodiments of the invention.

FIG. 4 depicts a flow diagram of a method 400 for automatic antenna alignment, according to one or more embodiments of the invention. The method 400 is performed by the drone controller 106 after the initial link from the RF test tool 104 to the target device 208 is established. The method 400 starts at step 402 and proceeds to step 404.

At step 404, a request is received to initiate optimal alignment. The request for alignment may be alignment between two RF test tools or an RF test tool and a network device, such as a gateway or connector. If the request is for alignment between an RF test tool and a network device, information associated with which network device is the target device is provided in the request.

At step 406, GPS and altitude data are collected from the RF test tool and the target device. The drone controller sends a request to the RF test tool to capture and send the GPS location and altitude of the RF test tool. The drone controller may use Simple Network Management Protocol (SNMP) Walk commands to request the information from the RF test tool. The drone controller also sends the request for GPS and altitude data to the target device and receives same from the target device.

At step 408, the bearing and altitude are calculated. Using the GPS and altitude information received on the drone controller, the bearing and height required of the drone site survey tool to achieve optimal alignment. The precision of the bearing and height adjustments is dependent on the horizontal and vertical beam width of the antennas, as well as the accuracy of the GPS and altitude data. In some embodiments, the accuracy of the data is +/−3 meters horizontal positioning and +/−4 meters vertical positioning. While the following describes a formula for calculating the bearing, those skilled in the art can appreciate that any method of calculating the bearing may be utilized.

Bearing is measured from True North, i.e. 0° bearing means North, 90° bearing is East, 180° bearing is measured to be South, and 270° to be West. If the longitude and latitude information from the GPS is received in decimal degrees, they are converted into Radians using the formula:

Long/Lat(Rad)=Long/Lat(Deg)×☐/180

The Bearing (β) from point A to B (e.g., from RF test tool A to target device B), can be calculated as follows, the coordinates in Radians are shown as 'La' being the longitude of drone A and 'θa' being the Latitude of drone A. Similarly, 'Lb' is the longitude for target device B and 'θb' is the Latitude for target device B:

β(Rad)=a tan 2(X,Y)

where, X and Y are two quantities and can be calculated as,

X=cos θb*sin ΔL

Y=cos θa*sin θb−sin θa*cos θb*cos ΔL and ΔL=Lb−La

As such, the final complete formula is:

β(Rad)=a tan 2(((cos θb*sin(Lb−La)),(cos θa*sin θb−sin θa*cos θb*cos(Lb−La)))

Once the bearing is calculated in Radians, it may be converted back to decimal degrees as follows β(Deg)=β(Rad)×π/180

The resulting decimal degrees bearing is converted to a true north reference that is usable by the drone controller. The conversion is completed as follows If β(deg) is greater than 90, then 360−β(deg)+90, else 90−β(deg)

This will result in the bearing that is required for optimal azimuth alignment.

Calculating the difference between in altitude between the two points, point A to B (e.g., from RF test tool A to target device B), is can be done as follows ΔAlt=Drone *A* Alt−Target Device *B* Alt The result is the change in altitude necessary for optimal vertical alignment.

At step 410, the drone aligns itself with the target device. In some embodiments, a user may select whether to align based on the calculated bearing, altitude, or both.

Optionally, at step 412, the link between the RF test tool and the target device is tested.

The method 400 ends at step 414.

Figure 5:
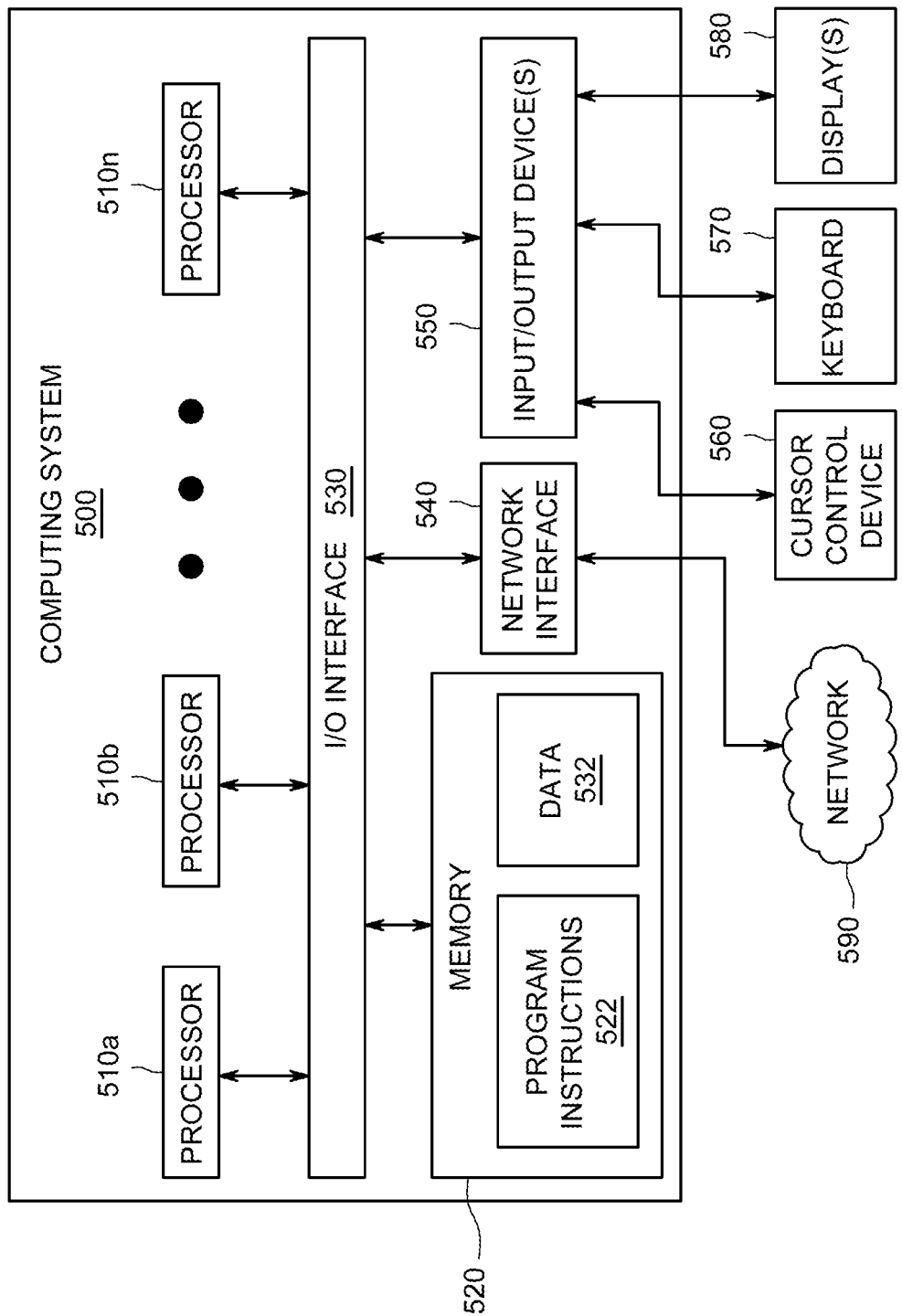
FIG. 5 depicts a computer system that can be utilized in various embodiments of the present invention to implement the computer and/or the display, according to one or more embodiments of the invention.

FIG. 5 depicts a computer system that can be used to implement the method of FIG. 4 in various embodiments of the present invention, according to one or more embodiments of the invention.

Various embodiments of method and apparatus for automatic antenna alignment, as described herein, may be executed on one or more computer systems, which may interact with various other devices. One such computer system is computer system 500 illustrated by FIG. 5, which may in various embodiments implement any of the elements or functionality illustrated in FIGS. 1-4. In various embodiments, computer system 500 may be configured to implement methods described above. The computer system 500 may be used to implement any other system, device, element, functionality or method of the above-described embodiments. In the illustrated embodiments, computer system 500 may be configured to implement method 400, as processor-executable executable program instructions 522 (e.g., program instructions executable by processor(s) 510) in various embodiments.

In the illustrated embodiment, computer system 500 includes one or more processors 510 coupled to a system memory 520 via an input/output (I/O) interface 530. Computer system 500 further includes a network interface 540 coupled to I/O interface 530, and one or more input/output devices 550, such as cursor control device 560, keyboard 570, and display(s) 580. In various embodiments, any of components may be utilized by the system to receive user input described above. In various embodiments, a user interface (e.g., user interface) may be generated and displayed on display 580. In some cases, it is contemplated that embodiments may be implemented using a single instance of computer system 500, while in other embodiments multiple such systems, or multiple nodes making up computer system 500, may be configured to host different portions or instances of various embodiments. For example, in one embodiment some elements may be implemented via one or more nodes of computer system 500 that are distinct from those nodes implementing other elements. In another example, multiple nodes may implement computer system 500 in a distributed manner.

In different embodiments, computer system 500 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 500 may be a uniprocessor system including one processor 510, or a multiprocessor system including several processors 510 (e.g., two, four, eight, or another suitable number). Processors 510 may be any suitable processor capable of executing instructions. For example, in various embodiments processors 510 may be general-purpose or embedded processors implementing any of a variety of instruction set architectures (ISAs), such as the x96, PowerPC, SPARC, or MIPS ISAs, or any other suitable ISA. In multiprocessor systems, each of processors 510 may commonly, but not necessarily, implement the same ISA.

System memory 520 may be configured to store program instructions 522 and/or data 532 accessible by processor 510. In various embodiments, system memory 520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 520. In other embodiments, program instructions and/or data may be received, sent or stored upon different types of computer-accessible media or on similar media separate from system memory 520 or computer system 500.

In one embodiment, I/O interface 530 may be configured to coordinate I/O traffic between processor 510, system memory 520, and any peripheral devices in the device, including network interface 540 or other peripheral interfaces, such as input/output devices 550, In some embodiments, I/O interface 530 may perform any necessary protocol, timing or other data transformations to convert data signals from one components (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. Also, in some embodiments some or all of the functionality of I/O interface 530, such as an interface to system memory 520, may be incorporated directly into processor 510.

Network interface 540 may be configured to allow data to be exchanged between computer system 500 and other devices attached to a network (e.g., network 590), such as one or more external systems or between nodes of computer system 500. In various embodiments, network 590 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 540 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 550 may, in some embodiments, include one or more display terminals, keyboards, keypads, touch pads, scanning devices, voice or optical recognition devices, or any other devices suitable for entering or accessing data by one or more computer systems 500. Multiple input/output devices 550 may be present in computer system 500 or may be distributed on various nodes of computer system 500. In some embodiments, similar input/output devices may be separate from computer system 500 and may interact with one or more nodes of computer system 500 through a wired or wireless connection, such as over network interface 540.

In some embodiments, the illustrated computer system may implement any of the methods described above, such as the methods illustrated by the flowchart of FIG. 4. In other embodiments, different elements and data may be included.

Those skilled in the art will appreciate that computer system 500 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, etc. Computer system 500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 500 may be transmitted to computer system 500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, etc.), ROM, etc.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method for automatic antenna alignment between a drone and a target device, comprising:
   receiving a request to initiate antenna alignment of a radio frequency (RF) test tool and a target device, wherein the RF site test tool tests a link with the target device at each available frequency and band;
   collecting location data from the RF site test tool;
   collecting location data from the target device;
   calculating bearing and altitude of the RF site test tool and the target device using the collected location data; and
   aligning the RF site test tool with the target device based on the calculated bearing and altitude.

2. The method of claim 1, further comprising:
   displaying an adjustment required to align the RF site test tool with the target device; and
   receiving an input to adjust at least one of an azimuth and the altitude of the drone.

3. The method of claim 1, further comprising testing a link between the RF site test tool and target device.

4. The method of claim 1, wherein a radio frequency site survey tool is attached to a drone.

5. The method of claim 1, wherein the location data comprises Global positioning system data and latitude data.

6. The method of claim 1, wherein the target device is a partner drone.

7. The method of claim 1, wherein the target device is an installed piece of equipment on one of a utility pole or communication tower.

8. A drone controller for automatic antenna alignment between a drone and a target device, comprising:
   a) at least one processor;
   b) at least one input device; and
   c) at least one storage device storing processor-executable instructions which, when executed by the at least one processor, perform a method including:
      receiving a request to initiate antenna alignment of a radio frequency (RF) test tool and a target device, wherein the RF site test tool tests a link with the target device at each available frequency and band;
      collecting location data from the RF site test tool;
      collecting location data from the target device;
      calculating bearing and altitude of the RF site test tool drone and the target device using the collected location data; and
      aligning the RF site test tool with the target device based on the calculated bearing and altitude.

9. The drone controller of claim 8, further comprising:
   displaying an adjustment required to align the RF site test tool with the target device; and
   receiving an input to adjust at least one of an azimuth and the altitude of the drone.

10. The drone controller of claim 8, further comprising testing a link between the RF site test tool and target device.

11. The drone controller of claim 8, wherein a radio frequency site survey tool is attached to a drone.

12. The drone controller of claim 8, wherein the location data comprises Global positioning system data and latitude data.

13. The drone controller of claim 8, wherein the target device is a partner drone.

14. The drone controller of claim 8, wherein the target device is an installed piece of equipment on one of a utility pole or communication tower.

15. A non-transitory computer readable medium for storing computer instructions that, when executed by at least one processor causes the at least one processor to perform a method for automatic antenna alignment between a drone and a target device, comprising:

receiving a request to initiate antenna alignment of a radio frequency (RF) test tool and a target device, wherein the RF site test tool tests a link with the target device at each available frequency and band;

collecting location data from the RF site test tool;

collecting location data from the target device;

calculating bearing and altitude of the RF site test tool and the target device using the collected location data; and aligning the RF site test tool with the target device based on the calculated bearing and altitude.

16. The non-transitory computer readable medium of claim 15, further comprising:

displaying an adjustment required to align the RF site test tool with the target device; and receiving an input to adjust at least one of an azimuth and the altitude of the drone.

17. The non-transitory computer readable medium of claim 15, further comprising testing a link between the RF site test tool and target device.

18. The non-transitory computer readable medium of claim 15, wherein a radio frequency site survey tool is attached to a drone.

19. The non-transitory computer readable medium of claim 15, wherein the location data comprises Global positioning system data and latitude data.

20. The non-transitory computer readable medium of claim 15, wherein the target device is one of an installed piece of equipment on one of a utility pole or communication tower or a partner drone.

* * * * *

UNITED STATES PATENT AND TRADEMARK OFFICE
CERTIFICATE OF CORRECTION

PATENT NO. : 11,101,539 B2  
APPLICATION NO. : 16/423782  
DATED : August 24, 2021  
INVENTOR(S) : Buydens et al.

Page 1 of 1

It is certified that error appears in the above-identified patent and that said Letters Patent is hereby corrected as shown below:

In the Claims

Column 10, Line 47, delete "drone"

Signed and Sealed this  
Fifth Day of October, 2021

Drew Hirshfeld  
*Performing the Functions and Duties of the*  
*Under Secretary of Commerce for Intellectual Property and*  
*Director of the United States Patent and Trademark Office*